(12) United States Patent
Ma et al.

(10) Patent No.: US 11,902,352 B2
(45) Date of Patent: Feb. 13, 2024

(54) HTTPDNS SCHEDULING METHOD, APPARATUS, MEDIUM AND DEVICE

(71) Applicant: GUIZHOU BAISHANCLOUD TECHNOLOGY CO., LTD., Guiyang (CN)

(72) Inventors: Hongguang Ma, Guiyang (CN); Kang Wang, Guiyang (CN); Lijia Fu, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/762,577

(22) PCT Filed: Aug. 26, 2020

(86) PCT No.: PCT/CN2020/111431
§ 371 (c)(1),
(2) Date: Mar. 22, 2022

(87) PCT Pub. No.: WO2021/057369
PCT Pub. Date: Apr. 1, 2021

(65) Prior Publication Data
US 2022/0345514 A1  Oct. 27, 2022

(30) Foreign Application Priority Data
Sep. 27, 2019 (CN) .......................... 201910926487.9

(51) Int. Cl.
*H04L 67/02* (2022.01)
*H04L 61/4511* (2022.01)
*H04L 67/1008* (2022.01)

(52) U.S. Cl.
CPC .......... *H04L 67/02* (2013.01); *H04L 61/4511* (2022.05); *H04L 67/1008* (2013.01)

(58) Field of Classification Search
CPC ........................... H04L 67/02; H04L 61/4511
See application file for complete search history.

(56) References Cited

U.S. PATENT DOCUMENTS

| 7,962,597 | B2 | 6/2011 | Richardson et al. |
| 11,095,605 | B1* | 8/2021 | Verma ..................... H04L 65/80 |
| 2012/0203864 | A1* | 8/2012 | Toth ................... H04N 7/17336 |
| | | | 709/217 |
| 2015/0040173 | A1 | 2/2015 | Panagos et al. |

(Continued)

FOREIGN PATENT DOCUMENTS

| CN | 104168340 A | 11/2014 |
| CN | 104219162 A | 12/2014 |

(Continued)

OTHER PUBLICATIONS

The World Intellectual Property Organization (WIPO) International Search Report for PCT/CN2020/111431 dated Nov. 27, 2020 6 Pages (with translation).

(Continued)

*Primary Examiner* — Andrew C Georgandellis
(74) *Attorney, Agent, or Firm* — ANOVA LAW GROUP, PLLC

(57) ABSTRACT

An HttpDNS scheduling method includes receiving a domain name resolution request from a client, the domain name resolution request including a customized parameter related to accessing resources; resolving the domain name resolution request and determining a target server based on the customized parameter; and returning an IP address of the target server to the client. The customized parameter includes at least one of a user parameter, a file type parameter, or a URL parameter

6 Claims, 2 Drawing Sheets

(56) References Cited

U.S. PATENT DOCUMENTS

| | | | |
|---|---|---|---|
| 2015/0256556 A1* | 9/2015 | Kaminsky | H04L 63/168 726/23 |
| 2016/0205062 A1 | 7/2016 | Mostert | |
| 2016/0255042 A1* | 9/2016 | Newton | H04L 61/30 709/245 |
| 2017/0134337 A1 | 5/2017 | Araújo | |
| 2020/0195669 A1* | 6/2020 | Karasaridis | H04L 63/10 |
| 2020/0293670 A1* | 9/2020 | Haapanen | G06F 21/35 |
| 2021/0029075 A1* | 1/2021 | Yu | H04L 67/02 |
| 2021/0058363 A1* | 2/2021 | Shen | H04L 67/52 |

FOREIGN PATENT DOCUMENTS

| | | |
|---|---|---|
| CN | 105162898 A | 12/2015 |
| CN | 105262841 A | 1/2016 |
| CN | 105847403 A | 8/2016 |
| CN | 103024001 B | 7/2018 |
| CN | 108881509 A | 11/2018 |
| CN | 109257450 A | 1/2019 |
| CN | 109756584 A | 5/2019 |
| CN | 109819066 A | 5/2019 |

OTHER PUBLICATIONS

The State Intellectual Property Office of People's Republic of China The First Office Action for CN 201910926487.9 dated Sep. 2, 2021 17 pages (with translation).

Kiang Xu et al., "Research on a Precise Controlling Converged CDN Traffic Scheduling Proportion", Sep. 25, 2019.

\* cited by examiner

HTTPDNS SCHEDULING METHOD, APPARATUS, MEDIUM AND DEVICE

CROSS-REFERENCE TO RELATED APPLICATIONS

The present application is a national stage entry under 35 U.S.C. § 371 of International Application No. PCT/CN2020/111431, filed on Aug. 26, 2020, which claims priority to Chinese Patent Application No. 201910926487.9, titled "HttpDNS SCHEDULING METHOD, APPARATUS, MEDIUM AND DEVICE," filed to the State Intellectual Property Office of People's Republic of China on Sep. 27, 2019, which are incorporated herein by reference in their entirety.

TECHNICAL FIELD

The present application relates to, but is not limited to, the technical field of internets, and in particular to an HttpDNS scheduling method, apparatus, medium and device.

BACKGROUND

In related technologies, HttpDNS interacts with the DNS server by the HTTP protocol, instead of the conventional DNS interaction based on the UDP protocol, thereby bypassing the operator's LocalDNS and effectively preventing domain name hijacking. In addition, because the HttpDNS server obtains the client's real IP, instead of the IP of LocalDNS, the client geographic location and the operator information can be accurately located, thereby effectively improving the scheduling accuracy.

However, in the related technologies, although attention is paid to the improvement of the user experience by scheduling, no attention is paid to the rational and effective use of service resources by the service provider to avoid waste or excessive concurrency pressure which may result in service unavailability.

SUMMARY

In order to overcome the problems in related technologies, the present application provides an HttpDNS scheduling method, apparatus, medium and device.

According to a first aspect of the present application, an HttpDNS scheduling method is provided, comprising:
receiving a domain name resolution request from a client, the domain name resolution request comprising a customized parameter related to accessing resources;
resolving the domain name resolution request and determining a target server based on the customized parameter; and
returning an IP address of the target server to the client, so that the client can access the target server.

The resolving the domain name resolution request and determining the target server based on the customized parameter comprises:
determining a target node according to a user's real IP;
obtaining the customized parameter in the domain name resolution request;
determining a candidate server in the target node based on the customized parameter; and
determining the target server according to a current state of the candidate server.

The customized parameter comprises a user parameter, a file type parameter, and a URL parameter; and the determining a candidate server in the target node based on the customized parameter comprises:
when the customized parameter refers to a single parameter, determining the candidate server according to the single parameter; and
when the customized parameter refers to multiple parameters, determining the candidate server in order of priority of the multiple parameters.

The determining the candidate server according to the single parameter comprises:
when the single parameter is the user parameter, querying a user weight and determining the candidate server according to the user weight;
when the single parameter is the URL parameter, querying an access popularity of the URL, and determining the candidate server according to the access popularity; and
when the single parameter is the file type parameter, determining a server that provide a service corresponding to a file type as the candidate server.

The determining the candidate server in order of priority of the multiple parameters comprises:
determining the candidate server according to a parameter with the highest priority, and if a load capacity of the candidate server is less than a preset threshold, determining the candidate server according to a parameter with the next highest priority; and
if the load capacity of the candidate servers is greater than the preset threshold, determining one or more target server from the candidate servers.

The determining a candidate server in the target node based on the customized parameter comprises: if the customized parameter is not obtained, determining all servers in the target node as the candidate servers.

According to another aspect of the present application, an HttpDNS scheduling apparatus is provided, comprising:
a request receiving module, configured to receive a domain name resolution request from a client, the domain name resolution request comprising a customized parameter related to accessing resources;
a resolving module, configured to resolve the domain name resolution request and determine a target server based on the customized parameter; and
a response module, configured to return an IP address of the target server to the client, so that the client can access the target server.

The determining the target server by the resolving module comprises:
determining a target node according to a user's real IP;
obtaining the customized parameter in the domain name resolution request;
determining the candidate server in the target node based on the customized parameter; and
determining the target server according to a current state of the candidate server.

The customized parameter comprises a user parameter, a file type parameter, and a URL parameter; and the determining a candidate server in the target node based on the customized parameter comprises:
when the customized parameter refers to a single parameter, determining the candidate server according to the single parameter; and
when the customized parameter refers to multiple parameters, determining the candidate server in order of priority of the multiple parameters.

The determining the candidate server according to the single parameter comprises:

when the single parameter is the user parameter, querying a user weight and determining the candidate server according to the user weight;

when the single parameter is the URL parameter, querying an access popularity of the URL and determining the candidate server according to the access popularity; and when the single parameter is the file type parameter, determining a server that provide a service corresponding to a file type as the candidate server.

The determining the candidate server in order of priority of the multiple parameters comprises:

determining the candidate server according to a parameter with the highest priority, and if a load capacity of the candidate server is less than a preset threshold, determining the candidate server according to a parameter with the next highest priority; and if the load capacity of the candidate servers is greater than the preset threshold, determining one or more target server from the candidate servers.

The determining a candidate server in the target node based on the customized parameter comprises: if the customized parameter is not obtained, determining all servers in the target node as candidate servers.

According to still another aspect of the present application, there is provided a computer-readable storage medium having a computer program stored thereon that, when executed, implements steps of the HttpDNS scheduling method.

According to yet another aspect of the present application, a computer device is provided, comprising a processor, a memory, and a computer program stored on the memory that, when executed by the processor, implements steps of the HttpDNS scheduling method.

In the present application, by the HttpDNS scheduling method, more refined scheduling may be implemented based on the customized parameter in the domain name resolution request from the client, so that resources may be used more rationally and effectively.

It should be understood that, the aforementioned general description and detailed description hereinafter are merely exemplary and explanatory, and the present application is not limited thereto.

BRIEF DESCRIPTION OF THE DRAWINGS

The accompanying drawings illustrated herein, which constitute part of the present application, are used to provide further understanding of the present application, and exemplary embodiments of the present application and the description thereof are used to explain the present application and not intended to inappropriately limit the present application. In the drawings.

DETAILED DESCRIPTION

The technical solutions in the embodiments of the present application will be described clearly and completely with reference to the accompanying drawings in the embodiments of the present application. Apparently, the embodiments to be described are some embodiments of the present application, rather than all embodiments of the present application.

Based on the embodiments of the present application, all other embodiments obtained by a person of ordinary skill in the art without paying any creative effort are included in the protection scope of the present application. It is to be noted that the embodiments of the present application and features in the embodiments may be combined if not conflict.

Figure 1:
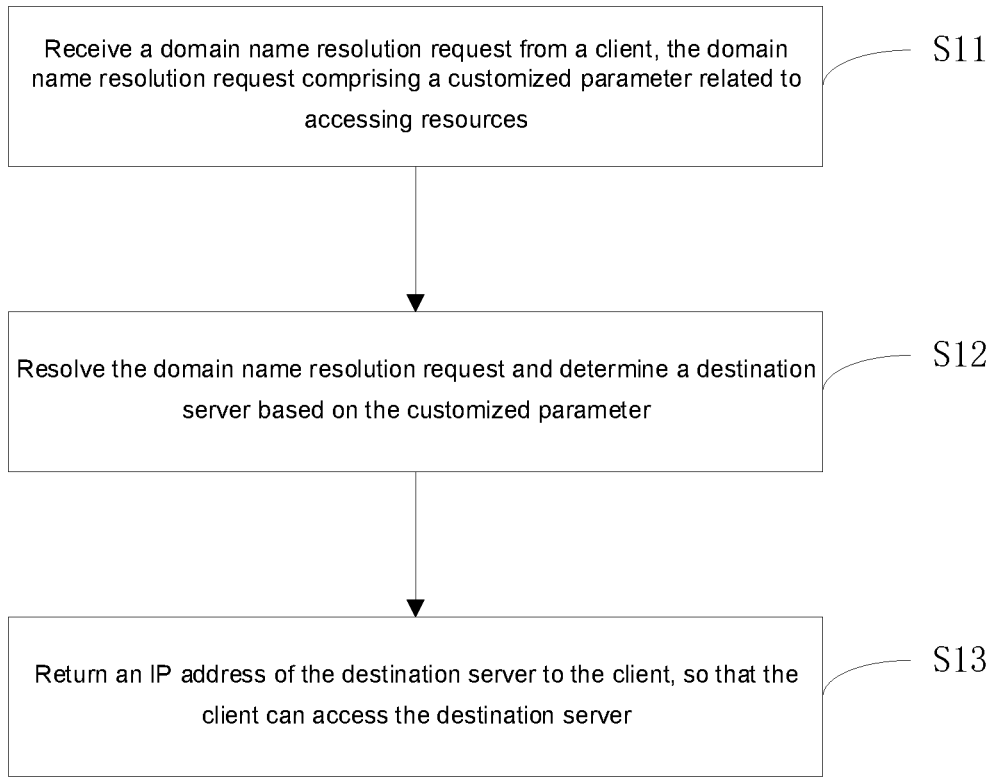
FIG. 1 is a flowchart of an HttpDNS scheduling method according to an exemplary embodiment.

FIG. 1 is a flowchart of an HttpDNS scheduling method according to an exemplary embodiment. Referring to FIG. 1, an HttpDNS scheduling method is provided, comprising:

S11: receiving a domain name resolution request from a client, the domain name resolution request comprising a customized parameter related to accessing resources;

S12: resolving the domain name resolution request and determining a target server based on the customized parameter; and S13: returning an IP address of the target server to the client, so that the client can access the target server.

In order to implement the method in the present application so that the client APP can easily and quickly access the HttpDNS system, the system provides a dedicated access API interface for APP developers to call. After the client APP receives user instructions, generate domain name resolution request according to the instruction from the user, and sends the domain name resolution request to the HttpDNS server through the dedicated API interface. When the client APP generates the domain name resolution request, it adds customized parameter related to accessing resources into the domain name resolution request. In order to ensure the success rate of domain name resolution, in the API interface, a backup link of the local DNS will be added. When the HttpDNS server fails to resolve the request from the client due to various reasons, the request from the client may be directed to the local DNS, and the local DNS will resolve the client request.

Meanwhile, the service party configures and plans the existing service resources according to its own situation, formulates a resource coverage plan and a resource usage plan, and stores them together with the current usage of the resources to get ready for querying at any time during the scheduling process. Service resources comprise node resources and server resources; and the current usage of resources is the real-time state information of device CPU, memory, disk, network IO, node bandwidth, etc.

Upon receiving the domain name resolution request, the HttpDNS server resolves the domain name resolution request, and determines a target server according to a customized parameter in the request. Thus, refined scheduling is realized, so as to rationally utilize service resources, avoid waste of resources and improve the quality of the service.

In an embodiment, the step S12 of resolving the domain name resolution request and determining the target server based on the customized parameter comprises:

determining a target node according to the user's real IP. In order to improve the utilization of its own resources, the service provider will formulate a node resource coverage plan and a resource usage plan before providing services, and deploy servers according to the node resource coverage plan and the resource usage plan. The resource usage plan is a server resource usage plan. The node resource coverage plan specifies the areas to be covered by resources for a certain node. The server resource usage plan specifies which users a specific server will give priority to. A specific server gives priority to the on-demand/live broadcast services, and a specific server gives priority to the file download services. Because the HttpDNS server obtains the client's real IP, instead of the IP of LocalDNS, the client geographic location and the operator information can be accurately located. A node that gives priority to the client may be determined by querying the resource coverage plan and resource usage plan according to the area where the client is located.

A customized parameter in the domain name resolution request is obtained. By resolving the request from the client, the customized parameter related to accessing resources, which is carried in the request from the user, is obtained.

Candidate server is determined in the target node based on the customized parameter. The identity of the user, the target content and target type accessed by the user may be determined by the customized parameter. Server, which give priority to the corresponding user and preferentially provide service related to the target content or target type, is selected from the node server as a candidate server.

A target server is determined according to a current state of the candidate server. Among the selected candidate servers, the server load capacity is determined according to the current state of the server resources, and a server with the load capacity greater than a preset threshold is selected as the target server.

In an embodiment, the customized parameter comprises: user parameter, file type parameter, and URL parameter. For example, the HttpDNS request is http://dns.example.com/query?dn=www.test.com&ednsip=x.x.x.x&user=xxx&type=pic&url=http://www.test.com/x/y/z. In this request, user=xxx is the user parameter, type=pic is the file type parameter, and url=http://www.test.com/x/y/z is the URL parameter. Of course, to implement the HttpDNS scheduling method in the present application, more detailed planning may be realized according to the service resources, with more refined parameter classification. It may be understood by those skilled in the art that the parameters herein comprise, but are not limited to the above parameters.

Determining a candidate server in the target node based on the customized parameter comprises:

When the customized parameter refers to a single parameter, the candidate server is determined according to the single parameter. For example, if there is only a user parameter in the request from the client, the resource usage plan is queried according to the user parameter, a user weight is determined, and a server that preferentially serve the user are selected as the candidate server.

When the customized parameter refers to multiple parameters, the candidate server is determined in order of priority of the multiple parameters. If the request from the client contains multiple parameters, the candidate server is determined in order of priority of the multiple parameters. For example, in this embodiment, according to the plan, the priority of the user parameter is higher than the priority of the file type parameter that is in turn higher than the priority of the URL parameter.

Determining the candidate server according to the single parameter comprises:

When the single parameter is the user parameter, the user weight is queried and the candidate server is determined according to the user weight. In order to provide better services, the service party will give weight ratings to users according to the different service levels purchased by the users. According to the user parameter in the request, the weight of a corresponding user may be queried, the high-weight users are scheduled to the local node, and the low-weight users are scheduled to the neighboring node, to make full use of node resources. Corresponding to the high-weight user, the server that preferentially serve the high-weight user in the node are used as the candidate server.

When the single parameter is the URL parameter, an access popularity of the URL is queried and the candidate server is determined according to the access popularity. The HttpDNS server counts all the accessed URLs and knows the access popularity of all URLs. Upon receiving a resolving request from a user, according to the URL parameters in the request, the access popularity of the URL is queried. Connect the URL access request with high access popularity to the server with the most users accessing the URL. That is, the user's access is scheduled to the server with the highest access popularity. The server with the highest access popularity here may be the one with the highest access popularity, or may be multiple servers with high access popularity selected according to the level of access popularity. Thus, requests with a large number of accesses are scheduled to a centralized server. The data that has been cached in the server is fully utilized, and the waste of bandwidth resources caused by pulling resources back to the parent node or back to the source station is avoided.

When the single parameter is the file type parameter, server that provide service corresponding to a file type are determined as the candidate server. In order to make full use of the resources used by the server, such as CPU, memory, disk, etc., the service party combines and optimizes the services on the server, and formulates a server resource usage plan. Access resources of different types are scheduled to appropriate servers. For example, some servers are suitable to be used as servers for downloading large files due to their large storage space, and some servers are suitable to be used as on-demand servers due to their large memory size. Therefore, different servers are suitable for different services. Some servers are suitable for video live/on-demand services, and some servers are suitable for file download services. By formulating the server resource usage plan, different servers are configured with different services, so that the server resources are fully utilized. Furthermore, this avoids the running out of the server resources due to the mismatch between the server performance and the services provided, which may affect the quality of the service and the user experience. For example, a server with a small storage space is used as a server for downloading large files. When in use, the server needs to cache the user's access content. This may quickly make the server's storage resources run out, resulting in the decreased service capacity or downtime. According to the file type parameter in the request from the client, the resource file type that the client wants to access may be known. The server that provide service corresponding to the file type is used as the candidate server, and an appropriate server is used to provide services to the client, thereby increasing the resource utilization and improving the user experience.

Determining the candidate server in order of priority of the multiple parameters comprises:

Candidate server is determined according to a parameter with the highest priority, and if the load capacity of the candidate server is less than a preset threshold, the candidate server is determined according to a parameter with the next highest priority. For example, if there are user parameter and file type parameter in the request from the client, first the candidate server is determined based on the user parameter, and the server load capacity is determined based on the current state of the candidate server resource. If the candidate servers are all in a high load state, or the load capacity of all the candidate servers is less than the preset threshold so that they cannot provide users with high-quality services, the HttpDNS will determine the server that provide service corresponding to the file type as the candidate server according to the file type parameter.

If the load capacity of the candidate servers is greater than the preset threshold, one or more target servers are determined from the candidate servers. If, among the candidate servers, the load capacity of all the candidate servers is greater than the preset threshold, or the load capacity of some candidate servers is greater than the preset threshold, one or more candidate servers are selected, as the target servers, from candidate servers whose load capacity is greater than the preset threshold, so as to provide users with better services.

In an embodiment, determining the candidate server in the target node based on the customized parameter comprises: if the customized parameter is not obtained, determining all servers in the target node as the candidate servers. When the request from the client does not carry any customized parameter or it is failed to obtain the customized parameter due to other reasons, the system will use all servers in the node as the candidate servers. Then, the server with the highest load capacity among the candidate servers is selected as the target server.

In order to better understand the HttpDNS scheduling method in the present application, an example will be given below.

The HttpDNS server receives a domain name resolution request from a user, and determines that the user is a Beijing Telecom user by querying the user's IP. By querying the resource coverage plan, there are three nodes covering this area: Telecom-Beijing, Telecom-Tianjin, and Telecom-Hebei. In order to ensure the quality of the user's access to the internet, the user's request is scheduled to the local node, that is, the node of Telecom-Beijing.

The domain name resolution request is resolved. For example, the HttpDNS request is http://dns.example.com/query?dn=www.test.com&ednsip=x.x.x.x&user=xxx&type=pic&url=http://www.test.com/x/y/z. The customized parameters are obtained from this request. The user parameter is user=xxx, the URL parameter is url=http://www.test.com, and the file type parameter is type=pic. According to the plan, among the above three customized parameters, the user parameter has the highest priority, the file type parameter has the next highest priority, and the URL parameter has the lowest priority. By query, the user is a certain company. The company has purchased a service from the service party. It is a high-weight user. By looking up the resource usage plan, the server that preferentially serve the high-weight user is determined as the candidate server.

The current state of the servers is queried. If the load capacity of one or more servers is greater than the preset threshold among all the candidate servers, then one or more servers whose load capacity is greater than the preset threshold will be used as the target servers, and the IP address of the target servers are sent to the user. The user directly accesses the target servers through the IP address, thereby ensuring the rights and the quality of access to the internet for the high-weight user.

If, after querying the current state of the servers, it is found that the load capacity of all the candidate servers is less than the preset threshold, it means that the current access amount is too large and the candidate servers can no longer provide services well. The HttpDNS will determine the candidate server according to the file type parameter in the request from the user. The file type parameter is type=pic. If the user's access resource type is picture, servers that provide a picture download service are found in the server cluster in the node, and the server that provide the picture download service is used as candidate server. By querying the current state of the candidate server, the load capacity of the servers is determined. A server with load capacity greater than the threshold, among the servers that provide the picture download service, is selected as the target server. The IP address of the target server is sent to the user. The user directly accesses the target server by the IP address, thereby ensuring the access speed and improving the user experience.

Figure 2:
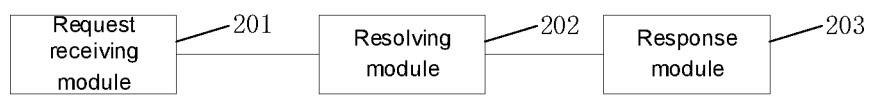
FIG. 2 is a block diagram of an HttpDNS scheduling apparatus according to an exemplary embodiment.

FIG. 2 is a block diagram of an HttpDNS scheduling apparatus according to an exemplary embodiment. Referring to FIG. 2, the HttpDNS scheduling apparatus comprises a request receiving module 201, a resolving module 202, and a response module 203.

The request receiving module 201 is configured to receive a domain name resolution request from a client, the domain name resolution request comprising a customized parameter related to accessing resources.

The resolving module 202 is configured to resolve the domain name resolution request and determine a target server based on the customized parameter.

The response module 203 is configured to return an IP address of the target server to the client, so that the client can access the target server.

Determining the target server by the resolving module comprises:
  determining a target node according to a user's real IP;
  obtaining the customized parameter in the domain name resolution request;
  determining a candidate server in the target node based on the customized parameter; and
  determining the target server according to current state of the candidate server.

The customized parameter comprises a user parameter, a file type parameter, and a URL parameter; and determining a candidate server in the target node based on the customized parameter comprises:
  when the customized parameter refers to a single parameter, determining a candidate server according to the single parameter; and
  when the customized parameter refers to multiple parameters, determining a candidate server in order of priority of the multiple parameters.

Determining a candidate server according to the single parameter comprises:
  when the single parameter is the user parameter, querying a user weight and determining the candidate server according to the user weight;
  when the single parameter is the URL parameter, querying an access popularity of the URL and determining the candidate server according to the access popularity; and
  when the single parameter is the file type parameter, determining servers that provide a service corresponding to a file type as the candidate server.

Determining the candidate server in order of priority of the multiple parameters comprises:
  determining the candidate server according to a parameter with the highest priority, and if a load capacity of the candidate server is less than a preset threshold, determining the candidate server according to a parameter with the next highest priority; and
  if the load capacity of the candidate servers is greater than the preset threshold, determining one or more target server from the candidate servers.

Determining the candidate server in the target node based on the customized parameter comprises: if the customized parameter is not obtained, determining all servers in the target node as candidate servers.

The specific manner in which modules of the apparatus in this embodiment perform operations has been described in detail in the embodiment of the method, and will not be repeated here.

The present application further provides a computer-readable storage medium having a computer program stored thereon that, when executed, implements steps of the HttpDNS scheduling method.

A computer device is provided, comprising a processor, a memory, and a computer program stored on the memory that, when executed by the processor, implements steps of the HttpDNS scheduling method.

Figure 3:
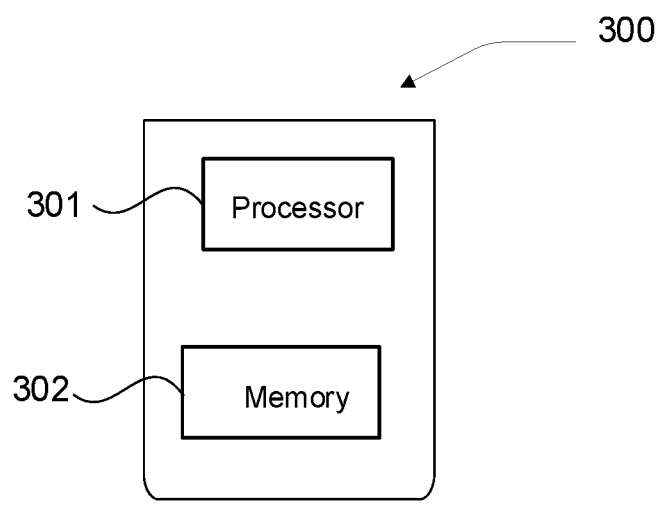
FIG. 3 is a block diagram of a computer device according to an exemplary embodiment.

FIG. 3 is a block diagram of a computer device 300 for HttpDNS scheduling according to an exemplary embodiment. For example, the computer device 300 may be provided as a server. Referring to FIG. 3, the computer device 300 comprises a processor 301. One or more processors may be provided according to actual needs. The computer device 300 further comprises a memory 302 configured to store instructions executable by the processor 301, for example application programs. One or more memories may be provided according to actual needs. There may be one or more application programs stored in the memory. The processor 301 is configured to execute instructions to perform the HttpDNS scheduling method.

It may be understood by those skilled in the art that the embodiments of the present application may be provided as methods, apparatuses (devices), or computer program products. Therefore, the present application may be in the form of an only hardware embodiment, an only software embodiment, or an embodiment combining software and hardware. Moreover, the present application may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present application has been described with reference to flowcharts and/or block diagrams of the methods, apparatuses (devices) and computer program products according to embodiments of the present invention. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that realizes the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operation steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present application have been described, those skilled in the art can make additional changes and modifications to these embodiments once they learn the basic creative concept. Therefore, the appended claims are intended to be interpreted as comprising the preferred embodiments and all changes and modifications falling into the scope of the present application.

Apparently, those skilled in the art can make various modifications and variations to the present application without departing from the spirit and scope of the present application. In this way, if these modifications and variations of the present application fall into the scope of the claims of the present application and their equivalents, the present application is intended to encompass these modifications and variations.

INDUSTRIAL APPLICABILITY

The present application provides an HttpDNS scheduling method, apparatus, medium and device. To ensure that the client APP can easily and quickly access the HttpDNS system, the system provides a dedicated access API interface for APP developers to call. After the client APP receives user instructions generate domain name resolution request according to the instruction from the user, and sends the domain name resolution request to the HttpDNS server through the dedicated API interface. When the client APP generates the domain name resolution request, it adds a customized parameter related to accessing resources into the domain name resolution request. Upon receiving the domain name resolution request, the HttpDNS server resolves the domain name resolution request, and determines a target server according to a customized parameter in the request. Thus, refined scheduling is realized, so as to rationally utilize service resources, avoid waste of resources and improve the quality of the service.

The invention claimed is:

1. An HttpDNS scheduling method comprising:
receiving a domain name resolution request from a client, the domain name resolution request including a customized parameter related to accessing resources; wherein the customized parameter includes at least one of a user parameter, a file type parameter, or a URL parameter;
resolving the domain name resolution request and determining a target server based on the customized parameter; and
returning an IP address of the target server to the client;
wherein resolving the domain name resolution request and determining the target server based on the customized parameter includes:
determining a target node according to a user real IP and a node resource coverage plan, wherein the node resource coverage plan specifies areas covered by resources of each node, and the each node comprises servers for providing the resources ;
in response to obtaining the customized parameter in the domain name resolution request, determining one or more candidate servers from all servers in the target node based on the customized parameter;
in response to not obtaining the customized parameter in the domain name resolution request, determining all servers in the target node as the one or more candidate servers; and
determining the target server according to a current state of each of the one or more candidate servers;
wherein determining the one or more candidate servers from all servers in the target node based on the customized parameter includes:
in response to the customized parameter including a single parameter,
determining the one or more candidate servers according to the single parameter; and
in response to the customized parameter including a plurality of parameters, determining the one or more candidate server in order of priority of the plurality of parameters, including:
determining a first candidate server according to one of the plurality of parameters that has a highest priority; and
in response to a load capacity of the first candidate server is less than a preset threshold, determining a second candidate server according to another one of the plurality of parameters that has a next highest priority; and
wherein determining the target server includes, in response to a load capacity of each of the one or more candidate servers being greater than the preset threshold, determining one or more target servers from the one or more candidate servers.

2. The HttpDNS scheduling method according to claim 1, wherein determining the one or more candidate servers according to the single parameter includes:
in response to the single parameter being the user parameter, querying a user weight and determining the one or more candidate servers according to the user weight;
in response to the single parameter being the URL parameter, querying an access popularity of a URL, and determining the one or more candidate servers according to the access popularity; and
in response to the single parameter being the file type parameter, determining a server that provide a service corresponding to a file type as one of the one or more candidate servers.

3. A non-transitory computer-readable storage medium storing a computer program that, when executed by a processor, causes the processor to:
receive a domain name resolution request from a client, the domain name resolution request including a customized parameter related to accessing resources; wherein the customized parameter includes at least one of a user parameter, a file type parameter, or a URL parameter;
resolve the domain name resolution request and determining a target server based on the customized parameter, including:
determining a target node according to a user real IP and a node resource coverage plan, wherein the node resource coverage plan specifies areas covered by resources of each node, and the each node comprises servers for providing the resources;
in response to obtaining the customized parameter in the domain name resolution request, determining one or more candidate servers from all servers in the target node based on the customized parameter;
in response to not obtaining the customized parameter in the domain name resolution request, determining all servers in the target node as the one or more candidate servers; and
determining the target server according to a current state of each of the one or more candidate servers; and
return an IP address of the target server to the client;
wherein the computer program further causes the processor to:
in response to the customized parameter including a single parameter, determine the one or more candidate servers according to the single parameter;
in response to the customized parameter including a plurality of parameters, determine the one or more candidate server in order of priority of the plurality of parameters, including:
determining a first candidate server according to one of the plurality of parameters that has a highest priority; and
in response to a load capacity of the first candidate server is less than a preset threshold, determining a second candidate server according to another one of the plurality of parameters that has a next highest priority; and
in response to a load capacity of each of the one or more candidate servers being greater than the preset threshold, determine one or more target servers from the one or more candidate servers.

4. The non-transitory computer-readable storage medium according to claim 3, wherein the computer program further causes the processor to:
in response to the single parameter being the user parameter, query a user weight and determine the one or more candidate servers according to the user weight;
in response to the single parameter being the URL parameter, query an access popularity of a URL, and determine the one or more candidate servers according to the access popularity; and in response to the single parameter being the file type parameter, determine a server that provide a service corresponding to a file type as one of the one or more candidate servers.

5. A computer device comprising:
a processor; and
a memory storing a computer program that, when executed by the processor, causes the processor to:
receive a domain name resolution request from a client, the domain name resolution request including a customized parameter related to accessing resources;
wherein the customized parameter includes at least one of a user parameter, a file type parameter, or a URL parameter;
resolve the domain name resolution request and determining a target server based on the customized parameter, including:
determining a target node according to a user real IP and a node resource coverage plan, wherein the node resource coverage plan specifies areas covered by resources of each node, and the each node comprises servers for providing the resources;
in response to obtaining the customized parameter in the domain name resolution request, determining one or more candidate servers from all servers in the target node based on the customized parameter;
in response to not obtaining the customized parameter in the domain name resolution request, determining all servers in the target node as the one or more candidate servers; and
determining the target server according to a current state of each of the one or more candidate servers; and
return an IP address of the target server to the client;
wherein the computer program further causes the processor to:
in response to the customized parameter including a single parameter, determine the one or more candidate servers according to the single parameter;
in response to the customized parameter including a plurality of parameters, determine the one or more candidate server in order of priority of the plurality of parameters, including:
determining a first candidate server according to one of the plurality of parameters that has a highest priority; and
in response to a load capacity of the first candidate server is less than a preset threshold, determining a second candidate server according to another one of the plurality of parameters that has a next highest priority; and
in response to a load capacity of each of the one or more candidate servers being greater than the preset threshold, determine one or more target servers from the one or more candidate servers.

6. The device according to claim 5, wherein the computer program further causes the processor to:
in response to the single parameter being the user parameter, query a user weight and determine the one or more candidate servers according to the user weight;
in response to the single parameter being the URL parameter, query an access popularity of a URL, and determine the one or more candidate servers according to the access popularity; and
in response to the single parameter being the file type parameter, determine a server that provide a service corresponding to a file type as one of the one or more candidate servers.

* * * * *